UNITED STATES PATENT OFFICE.

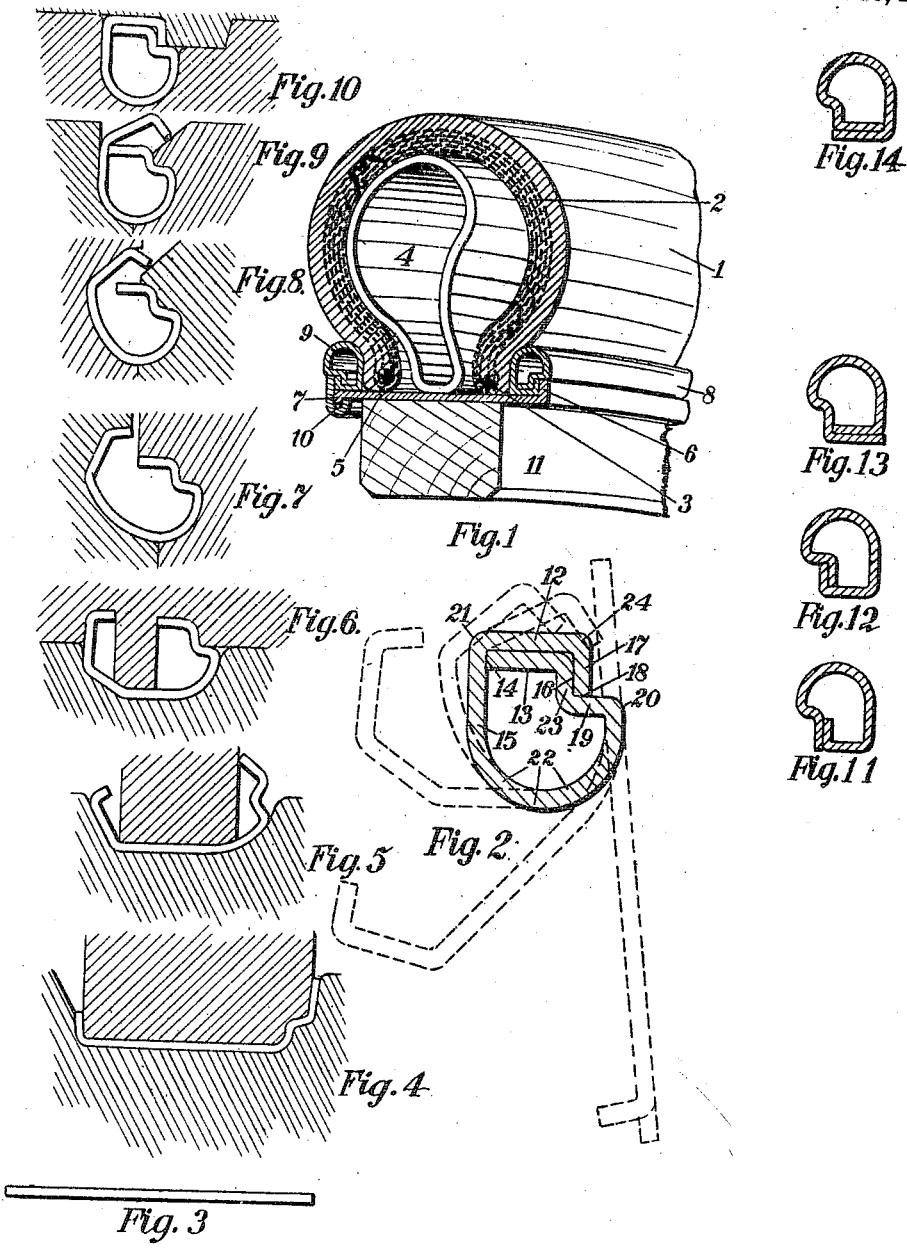

RICHARD S. BRYANT, OF COLUMBUS, OHIO, ASSIGNOR, BY MESNE ASSIGNMENTS, TO THE UNITED RIM COMPANY, OF AKRON, OHIO, A CORPORATION OF OHIO.

TIRE-RETAINING FLANGE FOR WHEEL-RIMS.

973,162.

Specification of Letters Patent. Patented Oct. 18, 1910.

Application filed April 6, 1907. Serial No. 366,747.

*To all whom it may concern:*

Be it known that I, RICHARD S. BRYANT, a citizen of the United States, residing at Columbus, in the county of Franklin and State of Ohio, have invented certain new and useful Improvements in Tire-Retaining Flanges for Wheel-Rims, of which the following is a specification.

My invention relates to improvements in tire-retaining flanges for wheel rims, which are adapted preferably to be placed upon the rim and removed therefrom at will, but the inner one of which may, if desired, be brazed upon said rim body; said flange is constructed with a flat base preferably, and is formed of material so pressed and bent into shape as to furnish a strongly braced support against which a tire when inflated may bear without any danger of the flange being crushed or distorted or removed from its proper position; it further contemplates a flange which may be formed from a single strip or ribbon of metal, which, by being fed through a series of dies or rolls, will progressively be given the desired sectional form, and may then be bent into a circle and the ends adjustably or rigidly secured together, whereupon the flange is ready for being seated upon the rim body for use; it further contemplates a flange which is entirely machine formed from the beginning with the flat strip or ribbon of metal to the end in the completed flange; and when finished it will be of such profile in cross section as to unlock, or to resist the strain applied by an inflated tire, without the necessity of brazing or welding the seam; it further contemplates the provision of optional forms or modifications of the flange, the characteristic of the same being the flat base and the recessed side for engagement with the rim flange or locking ring.

With these and other objects in contemplation which will be more definitely set forth in the following description and in the claims, reference is made to the drawings hereto attached which are hereby made a part of this specification, in which—

Figure 1 is a section through the tire and tire-retaining flanges and rim body and felly all in place; Fig. 2 shows the various steps by which the completed flange is formed, the various steps being shown in dotted lines; Fig. 3 is a view of the blank in section from which the flange is formed; Fig. 4 shows the form after passing through the first set of rolls; Fig. 5 shows the second step in the progress of the blank through the rolls. Fig. 6 indicates the third step; Fig. 7 the fourth step, Fig. 8, the fifth step; Fig. 9 the sixth and Fig. 10 shows the last step in which the parts are pressed into their final shape, the Figs. 11, 12, 13, and 14 show modified forms of the flange.

In the drawings 1 is an inflatable tire of the variety known on the market as the "Dunlop" tire, having woven therein the web 2, and having circumferentially inserted at its edges the wires 3, which bind the tire rigidly to the rim and maintain it in position; 4 is the inner tube. The tire is mounted upon the rim body 5 which is here shown as being formed in my preferred style, and has therefore at one edge the upturned flange 6 and at the opposite edge the downturned flange 7, the tire-retaining flange 8 being seated against the upturned flange 6, while the tire-retaining flange 9 is positioned upon the rim body upon the opposite side thereof. The tire-retaining flange 9 is maintained against movement off of the rim body by the locking ring 10 which is elastic and is adapted to be sprung upon the downturned flange 7 whereby it is positioned for engaging the tire-retaining flange 9 as shown. The inflation of the tire forces the edges or feet thereof into snug engagement with the tire-retaining flanges, and the wires 3 bind the tire into engagement with the rim body, and thereby not only hold the tire in position but also strengthen its construction.

The parts are adapted to be assembled in the following manner, namely, the tire-retaining flange 8 is positioned upon the rim body over the outer edge thereof and is then moved across the face until it engages the rim flange 6 and is snugly seated against the same; the deflated tire is next positioned upon the rim body over the outer edge thereof and pushed inwardly until the outer side thereof is advanced beyond the outer edge of the rim body, whereupon the tire-retaining flange 9 is positioned upon the rim body and moved inwardly thereon; now, the locking ring 10 is positioned upon the down-turned flange 7 in a manner well known and which need not be here more fully described. The tire is then inflated and the feet or edges thereof are driven into tight engagement with the tire-retaining flanges, one of which, 8, is maintained upon the face of the rim body by the upturned flange 6, the other, 9 is maintained upon the edge of the rim body by the long arm of the locking ring 10.

11 represents the felly, the remainder of the wheel not being shown.

The preferred form of the tire-retaining flange is shown in Figs. 1, 2 and 10, in which the base is shown as formed of two thicknesses of metal, 12 and 13; one edge 14 of the side 13 abuts against the long side 15 of the flange, the other edge 16 of the side 13 abuts against a portion 17 upturned from the base 12; the upper edge 18 of the portion 17 abuts against the outwardly curved or recessed portion 19, supporting the same from beneath; at a short distance outwardly from the upper edge 18, said portion 19 is curved as at 20, which curve is formed continuously around to one corner of the base 21, where the curve ceases and the horizontal or flat base portion is formed which is curved upwardly at its opposite side 24 to form the side 17 as noted. It will therefore be observed that the preferred form of my tire-retaining flange shows in section a metallic tubular construction having four rather sharp curves formed therein facing inwardly of the tube, and one curve facing outwardly thereof; these sharper curves are found near the base portion of the flange as it is normally positioned upon the rim body. The remaining portion of the flange is formed preferably of a continuous curve.

When the tire-retaining flange is in place on the rim body, the base portion 12 is in contact with the outer face of the rim body, while the upwardly bent portion 17 is in lateral engagement with the rim flange on one side of the rim body and with the long arm of the locking ring on the other side. The pressure from above is resisted by the general arched form of the upper portion of the tire-retaining flange as indicated at 22, said flange being carried as a whole upon the outer face of the rim body 5, the latter consequently sustaining all of the pressure upon the flange directed toward the center of the rim circle, while the lateral pressure due to the tire is maintained by the portion 13 lying upon the base 12 of the tube which abuts against the wall 15, thereby strengthening the same. The downward and lateral pressure are both borne, moreover, by the doubling or lapping of the portions 17 and 23, which affords strong resistance not only to lateral pressure but also to vertical stresses. The whole construction of the tire-retaining flange is such as to oppose greatest resistance where the stress due to the inflation of the tire and the use of the vehicle, is likely to be exerted; the tubular construction renders the tire-retaining flange light and the forms of the curves and the provision for lapping and doubling of the folds in the region of the base render the same very strong. A flat base is shown as preferable to assure a firm seating of the flange upon the face of the rim body, thereby preventing any tendency to turning.

The stages of progress in forming the flange from the ribbon or strip of steel are illustrated in Figs. 3 to 10 inclusive, the force being applied to the metal by means of rolls shaped properly to produce the desired form of the material operated upon, and arranged progressively, so that the material is fed from one series of rolls forward to another. An arbor is introduced into the system in Fig. 6 for the purpose of shaping the right hand portion of the flange as seen in said figure, and during the remainder of the process of shaping the tubular flange passes along upon the arbor, the forces to effect the proper shape being applied externally through the sets of rolls.

Figs. 11 to 14 inclusive show modified forms of construction, each being a cross section; in Fig. 11 the base is formed of a portion curved inwardly from the right and then upwardly, the overhanging externally-recessed portion overlapping or abutting against said upturned inner portion, while in Fig. 12, the side portion extending upwardly from the base overlaps the downwardly extending portion on the outside thereof, and forms a support for the overhanging externally recessed portion. In Fig. 13 the base portion is doubled, the inner portion abutting against the wall of the flange adjacent the externally-recessed portion, and supporting the same; in Fig. 14 the base portion is doubled, the inner portion abutting against the longer side wall of the flange.

From the foregoing description it will appear that my tire-retaining flange is formed by one continuous operation from a flat ribbon or strip of metal, the shape thereof being effected by a plurality of operations of properly constructed rolls and an arbor and with slight changes a number of modified forms may be made; the flange when completed is characterized by the flat base, the material preferably overlapping or being folded, and having such profile in cross section as to sustain the stress from the inflated tire without the necessity of brazing or welding the seam; and an external recess formed at one side of said flange, the adjacent walls thereof being supported and strengthened by a portion upturned from the outer fold of said base portion, and engaging one of the walls of said externally recessed portion laterally and the other from beneath. The inner fold of the base portion abuts against the wall of the tubular flange opposite the externally-recessed portion, and in this manner the base portion is firmly secured together and rigidly braced against stress exerted thereon under operating conditions. The arched form of the remaining portion of the tubular flange imparts great strength thereto, and the stresses set up by the inflated tire are met in every direction by the flange constructed in the general manner described above.

It will be understood that the metal when given the cross section shown in Figs. 1, 2 and 10, upon leaving the rolls, is extended; the curved form is imparted thereto by passing the same through a bending machine whereby the tubular construction is given a circular form, and the rolled metal having been cut into strips of the desired length, after the same have been formed into a circle, the ends are electrically welded, or otherwise rigidly or adjustably secured together, whereupon the flanges are ready for use.

Having described my invention, what I claim as new and desire to secure by Letters Patent is:

1. A hollow tire-retaining ring formed with a base for engaging and seating the same upon the face of the rim body of a wheel and having a recess formed in its periphery adjacent to the base, and being constructed to have overlapping parts for reinforcing the walls thereof.

2. A hollow tire-retaining ring having its lower portion substantially rectangular in cross section, and its upper portion substantially curved in cross section and overhanging said lower portion of said ring, said rectangular portion adjacent to said overhanging portion being formed of overlapping reinforcing members.

In testimony whereof I affix my signature in the presence of two witnesses.

RICHARD S. BRYANT.

Witnesses:
 GEO. W. RIGHTMIRE,
 A. RAGER.